United States Patent
Porter et al.

(10) Patent No.: US 10,885,580 B2
(45) Date of Patent: *Jan. 5, 2021

(54) ESCROWTAB MOBILE APPLICATION SYSTEM AND METHOD

(71) Applicant: EscrowTab, Inc., Tempe, AZ (US)

(72) Inventors: Kolin Blain Porter, Tempe, AZ (US); Adam McCurry Carlson, Tempe, AZ (US); Tim Gilker, Queen Creek, AZ (US)

(73) Assignee: EscrowTab, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,458

(22) Filed: Jun. 9, 2020

(65) Prior Publication Data
US 2020/0302522 A1    Sep. 24, 2020

Related U.S. Application Data

(63) Continuation of application No. 15/732,807, filed on Jan. 3, 2018, now Pat. No. 10,713,714.

(60) Provisional application No. 62/498,885, filed on Jan. 10, 2017.

(51) Int. Cl.
| | |
|---|---|
| *G06F 17/20* | (2006.01) |
| *G06Q 40/02* | (2012.01) |
| *G06Q 30/00* | (2012.01) |
| *G06Q 50/16* | (2012.01) |
| *G06F 40/103* | (2020.01) |
| *G06F 40/171* | (2020.01) |
| *G06F 40/174* | (2020.01) |
| *G06F 3/0485* | (2013.01) |

(52) U.S. Cl.
CPC .......... *G06Q 40/02* (2013.01); *G06F 40/103* (2020.01); *G06F 40/171* (2020.01); *G06F 40/174* (2020.01); *G06Q 30/018* (2013.01); *G06Q 50/167* (2013.01); *G06F 3/0485* (2013.01)

(58) Field of Classification Search
CPC .... G06Q 40/02; G06Q 30/018; G06Q 50/167; G06F 40/103; G06F 40/171; G06F 40/174; G06F 3/0485
See application file for complete search history.

(56) References Cited

U.S. PATENT DOCUMENTS

| | | | | |
|---|---|---|---|---|
| 7,281,133 | B2* | 10/2007 | Ginter | G06Q 20/023 713/176 |
| 2004/0199876 | A1* | 10/2004 | Ethier | G06F 40/117 715/249 |
| 2006/0277123 | A1* | 12/2006 | Kennedy | G06Q 40/025 705/35 |
| 2008/0292130 | A1* | 11/2008 | Nafarieh | G06K 9/00456 382/100 |

(Continued)

*Primary Examiner* — Mohammed H Zuberi
(74) *Attorney, Agent, or Firm* — David Terrell (57) ABSTRACT

The present invention, EscrowTab mobile application system and method comprises automating, reviewing, executing, and transmitting documents used in real estate financial transactions by providing document data visualization on a mobile device allowing for review and execution of financial closing documents, such as promissory notes, deeds of trust and financial documents on a mobile device such as a tablet and relaying these documents to and from the originating financial institution, via means of the internet or dedicated communications media.

20 Claims, 3 Drawing Sheets

(56) References Cited

U.S. PATENT DOCUMENTS

| | | | |
|---|---|---|---|
| 2012/0221944 A1* | 8/2012 | Bloomfield | G06Q 10/10 |
| | | | 715/255 |
| 2015/0150141 A1* | 5/2015 | Szymanski | G06F 16/93 |
| | | | 726/26 |
| 2018/0053265 A1* | 2/2018 | Lyon | G06F 16/9535 |
| 2018/0239959 A1* | 8/2018 | Bui | G06F 40/103 |
| 2018/0267946 A1* | 9/2018 | Dang | G06F 21/64 |

* cited by examiner

ESCROWTAB MOBILE APPLICATION SYSTEM AND METHOD

CROSS-REFERENCE TO RELATED APPLICATIONS

This application claims priority to provisional patent application Ser. No. 62/498,865, filed Jan. 10, 2017, and non-provisional patent application Ser. No. 15/732,807, filed Jan. 3, 2018, both of which are incorporated herein by specific reference.

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Compact disk 1 "ET Patent-2017" for Windows™ download of EscrowTab Mobile Application System and Method, compact disk 2 "ET Patent-2017" for duplicate Windows™ download of EscrowTab Mobile Application System and Method, including file "EscrowTab App, Services+Systems Technology" 2543 KB and file "EscrowTab Dev Info for App, Services+Systems Technology" 273 KB.

STATEMENT REGARDING PRIOR DISCLOSURES BY THE INVENTOR OR A JOINT INVENTOR

"Not Applicable"

BACKGROUND OF THE INVENTION

(1) Field of the Invention

The field of this invention is in automating, reviewing, executing, and transmitting documents used in financial lending transactions by providing document data visualization on a mobile device allowing for review and execution of all closing documents, including promissory notes, deeds of trust, and financial documents on a mobile device such as a computer tablet and relaying these documents to a financial institution via means of the internet or dedicated communications media.

The field of this invention is in visual display of financial lending data to provide understanding of the data and allowing for electronic execution of financial or escrow documents and allowing for electronic transmission of documents from a financial institution for electronic document filing in a digital media thereby eliminating paper handling and filing, thereby conserving natural resources.

The field of this invention is further in automating, reviewing, executing, and transmitting documents used in financial institution transactions related to Personal Property such as vehicles, major appliances, and promissory notes. All transaction documents in these financial areas are transmitted electronically from a financial institution to a borrower through an EscrowTab mobile application system and method of the present invention. Transmission medium is via the internet or a dedicated communications medium.

The EscrowTab mobile application and method is even further adaptable to financial transactions in financial instruments in Individual Retirement Accounts such as 401K's and similar financial instruments. All transaction documents in these financial areas are transmitted electronically from a financial institution to a retiree or future retiree through the EscrowTab mobile application system and method. Transmission medium is via the internet or a dedicated communications medium.

The EscrowTab mobile application system and method further conserves natural resources, for example, as the approximately 8 million financial transactions in the United States using paper documents can be transacted electronically and filed electronically with enormous savings in reviewing, signing, notary signing, and filing financial documents done electronically versus paper.

(2) Description of Related Art Including Information Disclosed Under 37 CFR 1.97

Financial lending transactions, in general, are document intensive. While there are numerous options for electronic or paperless loan applications at presents, there are few, if any, options to complete the loan closing. The closing paperwork typically involves approximately 100-200 legal and/or letter size printed pages which are reviewed and signed by the parties to the transaction. Typically, these paper pages are "imaged" or electronically scanned shortly after closing, and then subsequently discarded.

It would be advantageous to have a convenient application for a paperless device to facilitate document review, and document execution which replicated the process of signing paper documents. Through an electronic medium these documents would be transmitted by a financial institution to a mobile tablet for document review and execution at any secure location. Executed documents would then be transmitted back to the financial institution.

It would be advantageous to have a mobile computer tablet programmed with a mobile application to accept documents from a financial institution for review by the loan applicant(s) of these documents, to then execute by signature on the mobile application tablet itself using a stylus pen in a fashion that replicates the experience of signing paper documents with an ink pen. All signed transaction documents would then be transmitted electronically from to and from the originating financial institution through the mobile application system and method. Transmission medium is via the Internet or a dedicated communications medium.

It would further be advantageous to have a mobile application system and method adaptable to paperless documents in residential and commercial real estate transactions. A mobile application and method that further comprises banking transactions of personal property such as purchases of vehicles, major appliance purchases, and promissory notes by a lending bank or financial institution. All transaction documents in these financial areas are transmitted electronically from a financial institution to a borrower through a mobile application system and method. Transmission medium would be via the internet or a dedicated communications medium.

It would also be advantageous to have a mobile application system and method to create entities such as corporations, limited liability corporations, partnerships, limited partnerships and other entities to transact commercial real estate transactions.

It would even further be advantageous to have a mobile application and method even further adaptable to financial transactions in financial instruments in Individual Retirement Accounts such as 401K's and similar financial instruments. All transaction documents in these financial areas would be transmitted electronically from a financial institution to a retiree or future retiree through a mobile application system and method. Transmission medium would be via the internet or a dedicated communications medium.

Accordingly, it would even further be advantageous to provide a mobile application system and method to accomplish execution, or signing, of any document of financial transactions in Real Estate, Personal Property, Financial Transactions, Retirement Transactions, and Insurance Transactions, and Creation of Entities through the features of an electronic application system and method which replicates the experience of signing paper documents:

An even further objective is a mobile application system and method that conserves natural resources, for example, as the approximately 8 million mortgage transactions in the United States each using approximately 150 pages of paper, these documents can be transacted electronically and filed electronically with enormous savings in reviewing, signing, notary signing, and filing financial documents done electronically versus paper.

BRIEF SUMMARY OF THE INVENTION

The present invention, EscrowTab mobile application system and method comprises automating, reviewing, executing, and transmitting documents used in financial transactions by providing document data visualization on a mobile device allowing for review and execution of financial closing documents, such as promissory notes, deeds of trust and financial documents on a mobile device such as a tablet and relaying these documents to and from the originating financial institution, via means of the internet or dedicated communications media.

The present invention EscrowTab mobile application system and method provides visual display of document data for understanding of this data and allowing for electronic execution of financial closing documents and allowing for electronic transmission of such documents from a financial institution in conjunction with a loan applicant for electronic document filing in a digital media, thereby eliminating paper handling and filing, conserving natural resources.

The present invention EscrowTab mobile application provides a mobile application system and method to create entities such as corporations, limited liability corporations, partnerships, limited partnerships and other entities to transact commercial real estate transactions. Documents creating these entities are processed through the EscrowTab mobile application electronically through the internet or dedicated transmission medium.

The EscrowTab mobile application system and method further automates review and execution of documents used in Financial Institution transactions related to Personal Property such as vehicles, major appliances, and promissory notes. All transaction documents in these financial areas are transmitted electronically from a financial institution to a borrower through an EscrowTab mobile application system and method of the present invention. These transaction documents, when executed, are transmitted back to the financial institution. Transmission medium is via the internet or a dedicated communications medium.

The EscrowTab mobile application and method is even further adaptable to financial transactions in financial instruments in Individual Retirement Accounts such as 401K's and similar financial instruments. All transaction documents in these financial areas are transmitted electronically from a financial institution to a retiree or future retiree through the EscrowTab mobile application system and method of the present invention. Transmission medium is via the internet or a dedicated communications medium.

DETAILED DESCRIPTION OF THE INVENTION

Figure 1:
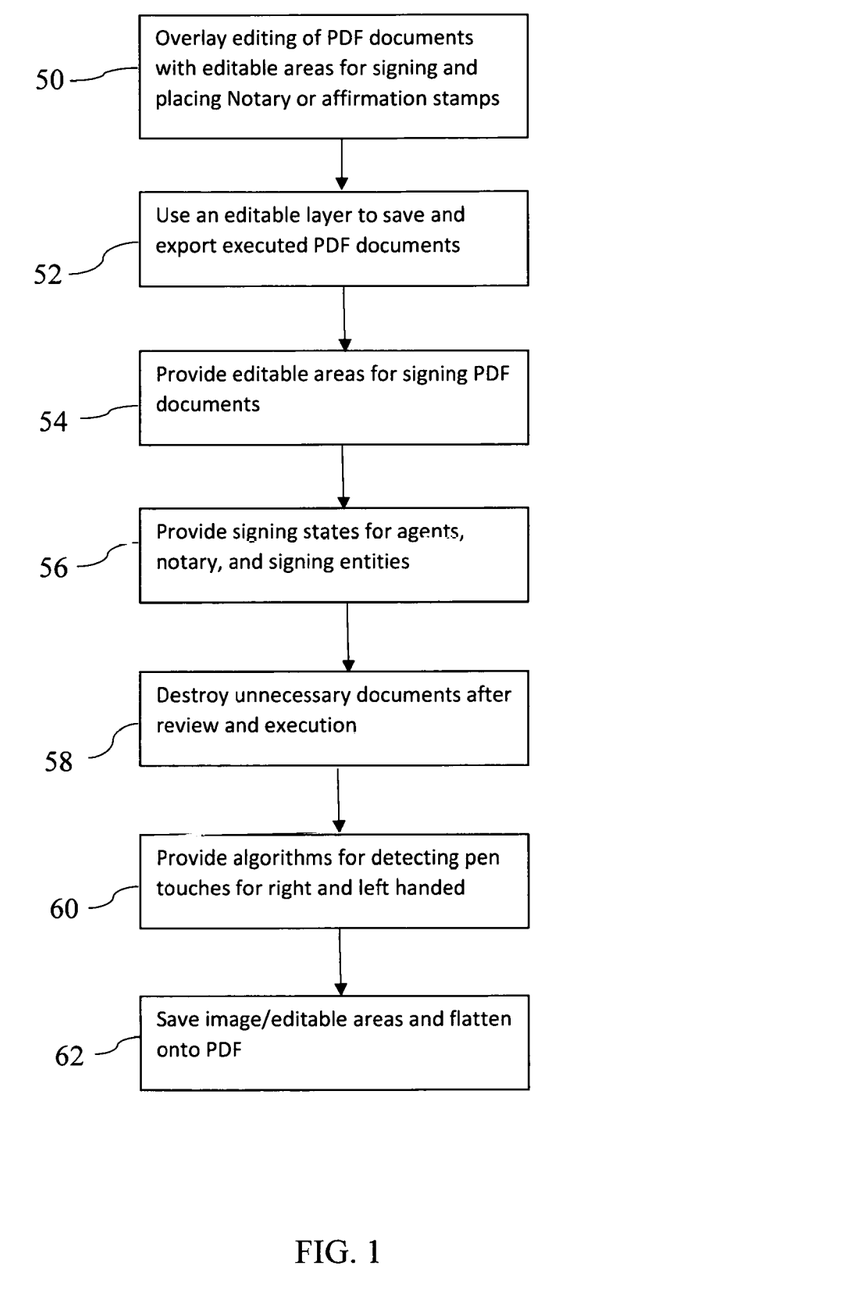
FIG. 1 is a flowchart of the EscrowTab system and method comprising Overlay editing of a PDF document with editable areas for signing and placing image stamps 50. A further step is to provide use of an editable layer to save and export signed and notarized PDF documents 52. Another step is to provide Full screen editable signing areas to recreate paper based experience of signing documents with an agent, notary and one or more people signing and initialing documents 54. A further step is to provide Signing states for agents, notary, and one or more people signing and initialing documents 56. Another step is to destroy unnecessary documents tablet/client mobile application after completing review and execution of documents 58. A further step is to provide algorithms to improve handwriting detection and detecting pen over hand touches for right and left handed people 60. A further step is to save image and editable areas and flatten onto PDF format excluding areas with no signage 62.
Figure 2:
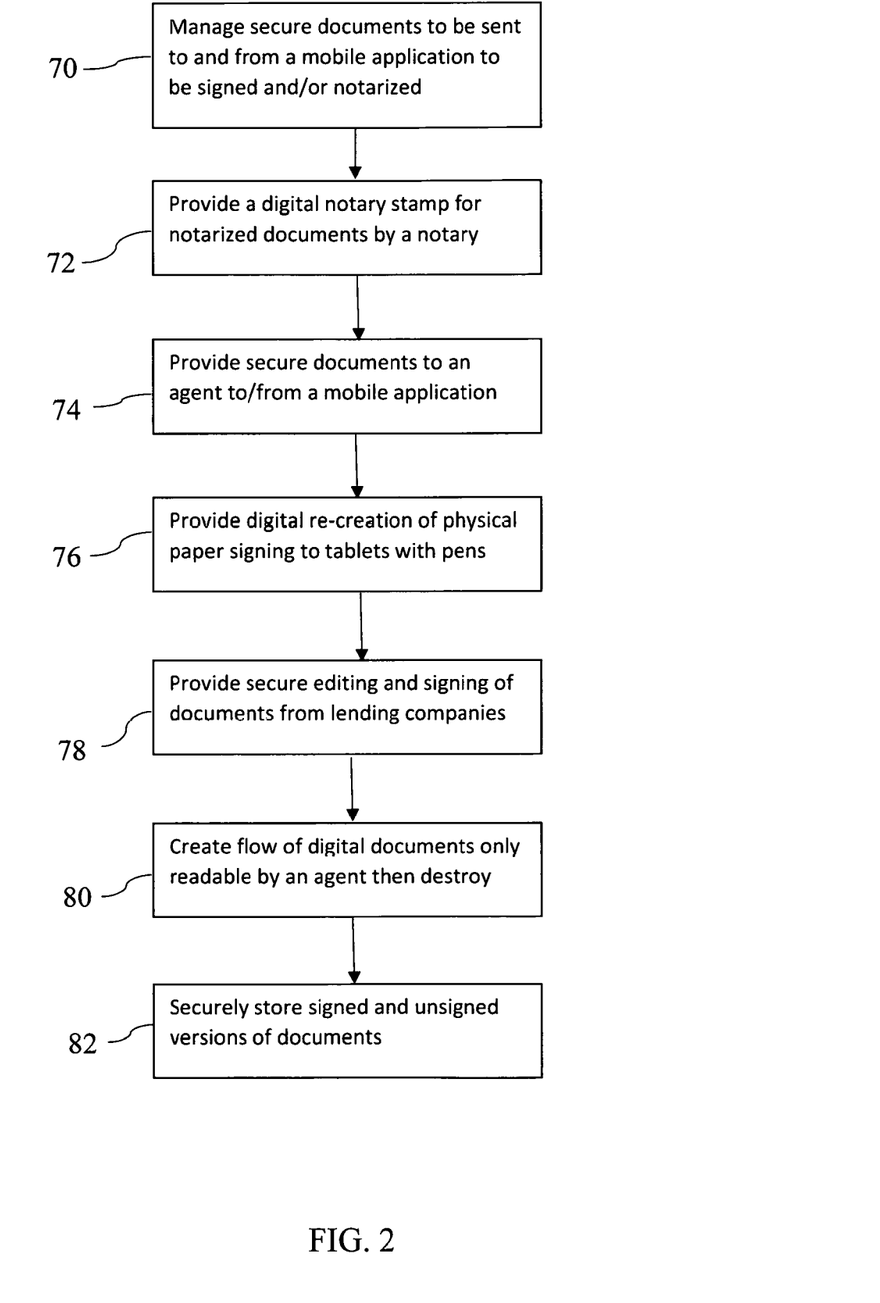
FIG. 2 are further steps of the EscrowTab system and method comprising the step of managing secure documents to be sent to and from the EscrowTab mobile application to be signed and notarized 70. A next step is to provide digital notary stamps through the EscrowTab mobile application for signature by a notary 72. Another step is to provide secure documents to an agent and receive documents through use of said mobile application 74. A further step is to provide digital re-creation of physical paper signing to tablets with digital pens 76. Another step is to provide secure editing and signing of documents that are transmitted from lending companies to agents and include a notary as part of the process 78. A further step is to create flow of digital documents that are only readable by the agent and client through the EscrowTab mobile application while being signed, when signing is complete the document on the client application is destroyed 80. A next step is to securely store signed and unsigned versions of documents through the EscrowTab mobile application 82.
Figure 3:
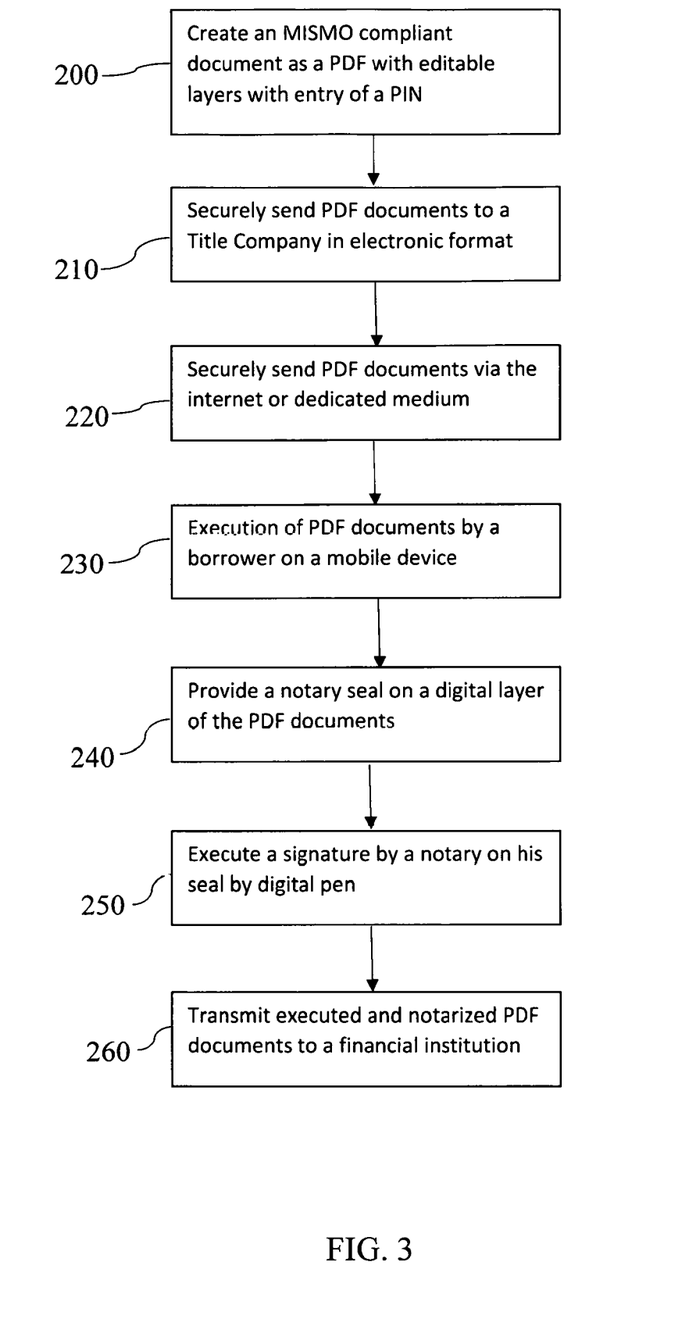
FIG. 3 shows a flowchart of the EscrowTab mobile application and method comprising the steps of creating a MISMO compliant document as a PDF with entry of a PIN on said mobile application 200. A next step is to securely send said PDF document to a Title Company via the EscrowTab mobile application 210. A coincident step is to send said PDF document in electronic format via the internet or a dedicated communications medium 220. A next step is to execute by signature by a borrower signing said PDF document digitally by using a digital pen on the screen of a mobile device equipped with the EscrowTab mobile application 230. A further step is to provide an image seal of a notary seal on a digital layer of said PDF document 240. A coincident step is to execute a signature by a notary on his seal by digital pen 250. A next step is to transmit said executed PDF document to a financial institution 260.

Incorporated by reference and claiming benefit of provisional patent U.S. 62/498,865, filed Jan. 10, 2017.

The present invention, EscrowTab mobile application system and method comprises automating, reviewing, executing, and transmitting documents used in Real Estate transactions by providing document data visualization on a mobile device allowing for review and execution of financial closing documents, such as promissory notes, deed of trusts, and financial documents on a mobile device such as a tablet and relaying these documents to and from a financial institution via means of the internet or dedicated communications media.

EscrowTab mobile application system and method provides electronic documents for real estate transactions based on MISMO™ standards, which is the standards development body for the mortgage industry. MISMO™ developed a common language for exchanging information for the mortgage finance industry. MISMO™ standards are accepted and deployed by every type of entity involved in creating mortgages, and they are required by most regulators, housing agencies, and lender's that participate in the industry.

The present invention provides visual display of Real Estate data for understanding of this data and allowing for electronic execution of financial or escrow documents and allowing for electronic transmission of Real Estate documents from a borrower to a Title Company for electronic document filing in a digital media, thereby eliminating paper handling and filing, conserving natural resources.

The EscrowTab system and method is developed as a mobile application and web based application. Incorporated by reference are compact disks with files 'EscrowTab App, Services+System Technology' and 'EscrowTab Dev Info for App, Services+Systems Technology'. The various screens provided are:
  Login via email and password
  Document List+Search View
  Document List+Search View with Filters
  Document State View
  Document View Signing
  Document View Placement+Position/Zoom
  Document View Date
  Document Notary The various screens used by the EscrowTab mobile application are discussed further in more detail.

A screen of the EscrowTab mobile application system and method shows an icon for Username and an icon for Password and further an icon for Double Authorization. When these fields are filled in, a Submit icon is tapped.

A second screen of the EscrowTab mobile application system and method shows an icon for Search with a field to fill information for locating files for a particular real estate closing, an icon for Loan Officer and an icon for Closing Documents. Once a Search field is located, Loan Officer, and Closing Documents, a Launch icon is tapped to launch the Closing Documents and an icon Preview is tapped to preview Closing Documents.

Another screen of the EscrowTab mobile application system and method shows an icon for Start Signing Process which will require a pin to be entered in icon Enter Pin with an icon for actual Pin Entry. Once Pin is entered, icon Review Documents is tapped.

A further screen of the EscrowTab mobile application system and method shows an icon Submit to submit and review closing documents.

Another screen of the EscrowTab mobile application system and method showing an icon Loan Detail Report which shows Loan Number, Borrower, Property Address, Worksheet #, Client #, and Report Date. This screen further shows Borrower/Seller showing Name of Borrower, Credit Agency Score, Range, Date, Factors, Final Resolution, Vesting to Read, and Sellers. This screen also shows Property showing Address, and Preliminary Title Information. The screen further shows Terms which comprises Terms of the Agreement, ARM which is interest and payment information, HELOC, and Miscellaneous. Also shown are Service Providers which includes Title Insurance. On the top of the screen is a Top Header showing icon fields Reprint Page, Notary, Complete and Page Back, and Page Forward.

A further screen of the EscrowTab mobile application system and method shows a Uniform Residential Loan Application, Type of Mortgage and Terms of Loan, Property Information and Purpose of Loan, Borrower information consisting of Borrower and Co Borrower information fields. This screen also includes Top Loan Header which includes icon fields Stylus On, Undo, Review/Live, Complete, Page Back and Page Forward.

Another a screen of the EscrowTab mobile application system and method shows a signature screen comprising Borrower Signature Line, and Witness Signature Line. Also shown is Top Loan Header which includes icon fields Stylus On, Undo, Review/Live, Complete, Page Back and Page Forward.

A further screen of the EscrowTab mobile application system and method shows a signature screen comprising Borrower Signature Line, and Lender Signature Line. Also shown is Top Loan Header which includes icon fields Stylus On, Undo, Review/Live, Complete, Page Back and Page Forward.

Another screen of the EscrowTab mobile application system and method shows a Corporation Assignment of deed of Trust with Corporation Signature Line, Preamble and Notary Signature Line. Also shown is a Stamp Top Header which consists of icon fields Stylus On, Undo, Enable Stamp, Complete, Page Back and Page Forward.

A further screen of the EscrowTab mobile application system and method shows a Corporation Assignment of deed of Trust with Corporation Signature Line, Preamble and Notary Signature Line. Also shown is a Stamp Top Header which consists of icon fields Stylus On, Undo, Enable Stamp, Complete, Page Back and Page Forward. This screen also shows superimposed on a Corporation Assignment of Deed of Trust screen a Submit icon field to submit the entered information, submitting to files of the EscrowTab mobile application system and method.

A further screen of the EscrowTab mobile application system and method shows a screen comprising icon fields Review Before Submit and Final Submit.

Another screen of the EscrowTab mobile application system and method shows a screen comprising icon fields LOGIN, TWO-FACTOR AUTH, and TEST USER AUTH.

A further screen of the EscrowTab mobile application system and method shows a document screen comprising a selection of documents with icon fields LAUNCH or REVIEW selections. Also shown is a Search Documents icon field to recall documents available for review and transact a signature or notary signature.

A further screen of the EscrowTab mobile application system and method shows a review screen comprising icon fields START SIGNING PROCESS, REVIEW DOCUMENTS, OR BACK TO DOCUMENTS.

Another screen of the EscrowTab mobile application system and method shows a signing screen showing a document to be reviewed and signed or provide a notary seal, comprising icon fields REPRINT PAGE, SIGN, NOTARY STAMP, AND COMPLETE field icons.

A further screen of the EscrowTab mobile application system and method shows a notary screen comprising icon fields LOGIN, TWO FACTOR AUTH, and TEST USER AUTH. Also shown are icon fields with REPRINT PAGE, SIGN, NOTARY SIGN, and COMPLETE icon fields.

Another screen of the EscrowTab mobile application system and method shows a signing screen and further shows a signed document. This screen also comprises icon fields with REPRINT PAGE, SIGN, NOTARY STAMP, and COMPLETE.

A further screen of the EscrowTab mobile application system and method shows a notary screen with icon fields USE STAMP, AND LOGOUT. This screen further shows icon fields comprising REPRINT PAGE, SIGN, NOTARY SEAL, and COMPLETE.

A last screen of the EscrowTab mobile application system and method shows a notary signed screen showing a document which is signed and stamped with a notary seal via the EscrowTab mobile application system and method.

The loan documents transmitted to the EscrowTab mobile application are prepared by a financial institution or an agent of a lender. The number of documents to sign and document content will depend on the financial institution. The loan documents are reviewed and executed using the EscrowTab mobile application system and method. Typical loan documents are:

i. A note. This document provides evidence of debt to a lender, a description of the loan terms, and a means for the lender to transfer or collect the debt. A note will state the amount of debt, the initial interest rate, the terms of any interest rate changes, and the time and place for payment. A note has value in and of itself, similar to checks or instruments of value. A lender can sell a loan and will physically give a note to a loan purchaser. A note will be reviewed and signed by the borrower using the EscrowTab mobile application.

ii. A mortgage or deed of trust. A mortgage, or deed of trust, is an agreement to put up the real estate property as collateral for a loan. It is signed by the borrower using the EscrowTab mobile application and transmitted to the home office of the lender via the EscrowTab mobile application. It is typically recorded in a county recorder's office, and becomes a lien against the real estate property.

iii. A loan application. A loan application form is completed to apply for a real estate loan. A lender will fill a loan application form with information provided by an original loan application for closing of documents. This loan application at closing will be reviewed for changes using the EscrowTab mobile application, and can be updated with the EscrowTab mobile application.

iv. A loan estimate and closing disclosure. For financial applications, a borrower will receive a loan estimate which provides information on all closing documents with disclosure of financial information, viewed on the EscrowTab mobile application.

v. Associated documents. Various other disclosures and agreements may be included in a loan package and viewed and reviewed by the EscrowTab mobile application. A compliance agreement is used to fix any discrepancies in loan documents, an agreement which is reviewed and executed via the EscrowTab mobile application.

vi. Affidavits. A lender may require a borrower to sign affidavits certifying that a borrower will occupy a property as a primary residence, signed via the EscrowTab mobile application.

vii. Real Estate Title Documents. A main title document is a title insurance commitment showing a party in title. This document also shows all of the liens or other clouds on tile. A title commitment document is reviewed through the EscrowTab mobile application.

viii. ALTA statement. A title company includes an ALTA statement, which is a one page affidavit similar to a seller's affidavit of title, viewed through the EscrowTab mobile application.

ix. Disbursement Agreement. This document allows a title company, as escrowee, to disburse loan proceeds, reviewed and executed through the EscrowTab mobile application.

x. As with residential transactions, commercial real estate transactions will include a typical quitclaim deed, non-foreign affidavit and title affidavit.

xi. However, there will be several other documents included in the transfer package, viewed and executed through the EscrowTab mobile application.

The present invention EscrowTab mobile application provides a mobile application system and method to create entities such as corporations, limited liability corporations, partnerships, limited partnerships and other entities to transact commercial real estate transactions.

Features of the present invention, the EscrowTab mobile application system and method are the following:

i. Overlay editing of a PDF document with editable areas for signing and placing image stamps through the EscrowTab mobile application;

ii. Through the EscrowTab mobile application, provide use of an editable layer to save and export signed and notarized PDF documents;

iii. Through the EscrowTab mobile application, provide Full screen editable signing areas to recreate paper based experience of signing documents with an agent, notary and one or more people signing and initialing documents;

iv. Through the EscrowTab mobile application, provide Signing states for agents, notary, and one or more people signing and initialing documents;

v. Documents are destroyed on tablet/client mobile application after completing review and execution of documents through the EscrowTab mobile application;

vi. Through the EscrowTab mobile application provide Algorithms to improve handwriting detection and detecting pen over hand touches for right and left handed people;

vii. The EscrowTab mobile application is optimized to only save image/editable areas and flatten onto PDF excluding areas with no signage;

viii. For a Notary, manage secure documents to be sent to and from the EscrowTab mobile application to be signed and notarized;

ix. For a Notary, provide digital notary stamps through the EscrowTab mobile application;

x. For an Agent of a financial institution to manage important secure documents to be sent to and from the EscrowTab mobile application to be signed and notarized;

xi. In general, through the EscrowTab mobile application, digital re-creation of physical paper signing to tablets with digital pens;

xii. In general, through the EscrowTab mobile application, secure editing and signing of documents that are transmitted from lending companies to agents and include a notary as part of the process;

xiii. In general, create flow of digital documents that are only readable by the agent and client through the EscrowTab mobile application while being signed, when signing is complete the document on the client application is destroyed; and xiv. In general, securely store signed and unsigned versions of documents through the EscrowTab mobile application.

The following is a high level overview of the EscrowTab (ET) app and features in the field of real estate documents:

i. The scope of the EscrowTab product is to facilitate the signing, notarizing and secure transfer of documents to and from financial institutions and their agents.

ii. Improve the financial closing process into a digital format that adheres to MISMO compliance and can securely send and receive financial documents between stakeholders in the workflow process.

A process and work flow for use of EscrowTab in real estate transactions is the following:

i. Create an MISMO compliant document as a PDF with entry of a PIN ii. Securely send PDF documents to a Title Company via EscrowTab mobile application system and method iii. A Title Company using EscrowTab receives a PDF document via the internet or a dedicated communications medium iv. A borrower signs the PDF document digitally using the EscrowTab mobile application v. A Title Company notarizes the document digitally via the EscrowTab mobile application vi. A Title Company Securely Sends an executed PDF document to a financial institution via EscrowTab mobile application Scope of the EscrowTab mobile application system and method is the following:

A Windows style application miming on a computer tablet that is paper size

Secure document transfer from a financial institution to a mobile device running the EscrowTab mobile application The EscrowTab mobile application displays MISMO compliant PDF documents on a computer tablet The EscrowTab mobile application allows a borrower to review and sign digitally on the surface of a computer tablet The EscrowTab mobile application allows a notary to place a seal and sign digitally on the surface of a computer tablet The Escrow Application will send back the encoded unaltered PDF document file and signed file securely to company of origin via the EscrowTab mobile application system and method Separation of Title Instructions via the EscrowTab mobile application are the following:

Signature tags and validation

Biometric login/signature

Document tracking, auditing features

The EscrowTab mobile application system and method provides for the following features plus workflow:

i. PDF Document Editing ii. PDF Document Signing

The EscrowTab mobile application system and method contains a fast native mobile canvas to allow digital signatures and digital placement of notary stamps while reviewing or editing the document for signing and stamping.

Workflow Features of the EscrowTab mobile application system and method help the goal of EscrowTab to improve the process of financial-loan document workflows by allow digital signatures and notarization, or other document affirmation, of MISMO compliant documents using computer tablets. Customers sign documents that re-create the physical paper signing experience and adheres to the same MISMO compliance.

EscrowTab mobile application Features for Workflow are the following:

i. Digital re-creation of physical paper signing to computer tablets with digital pens ii. Secure editing and signing of PDF documents that are transmitted from companies to agents for borrowers to sign, including a notary or other document affirmation as part of the process iii. Create flow of digital documents that are only readable by an agent through the EscrowTab mobile application while being signed; when signing is complete the document is destroyed iv. Securely store signed and unsigned versions of documents between EscrowTab workflows EscrowTab Mobile Application System and Method Organizations Organizations are the top most role in the EscrowTab mobile application systems. An organization can have many documents, agents, and notaries that have secure access to signing workflows and completed PDF documents. Organizations use the EscrowTab management web application and mobile application to manage the processes and teams needed to execute financial documents digitally.

EscrowTab mobile application Organization Tools are the following:

i. Manage important secure documents to be sent to and from the EscrowTab mobile application to be signed and notarized.

ii. Manage work of loan agents who have access via the EscrowTab mobile application iii. Manage work of title agents or companies who have access to the EscrowTab mobile application iv. Manage work of notary agents and provide digital notary stamps via the EscrowTab mobile application v. Manage PDF document availability vi. Manage PDF document states along workflow via the EscrowTab mobile application Financial institutions, and their agents, on the EscrowTab mobile application may send or receive documents to be signed by the applicant, Title Company, and notary or other document affirmation process. Financial institutions are provided the following tools via the EscrowTab mobile application:

i. Manage important secure documents to be sent to and from the EscrowTab mobile application to be signed and notarized, or other document affirmation, between financial companies and their agents ii. Manage the work of loan agents who have access to the EscrowTab mobile application iii. Manage the work of title agents or companies who have access to the EscrowTab mobile application
iv. Manage the work of notary agents and provide digital notary, or other affirmation stamps via the EscrowTab mobile application
v. Manage documents in the EscrowTab mobile application system to securely send and receive these documents Financial institutions or their agents may send or receive documents to be signed by the applicant, other parties to the transaction, and/or notary, or other document affirmation, via the EscrowTab mobile application. Include the following:
  i. Manage important secure documents to be sent to and from the EscrowTab mobile application to be signed and notarized between financial companies and their agents
  ii. Manage the work of loan agents who have access to the EscrowTab mobile application
  iii. Manage the work of title agents or companies who have access to the EscrowTab mobile application
  iv. Manage the work of notary agents and provide digital notary stamps via the EscrowTab mobile application
  v. Manage documents in the EscrowTab mobile application system to securely send and receive these documents Notary Agents are provided the following tools via the EscrowTab mobile application:
  i. Digital notarization that follows paper based notary work flow
  ii. Digital notary or other document affirmation stamps
  iii. Digital notary or other document affirmation management system for any notary who has access to the EscrowTab mobile application Systems The systems that run EscrowTab include the mobile application, management web application, backend servers in the cloud, storage, and databases. These systems will be further explained.

The EscrowTab mobile application system and method comprises Canvas Drawing Overlay Signing plus Notary. Native drawing overlay using Window native libraries to create faster drawing experience for signing and stamping. Highly optimized save and loading flows for loading document content from disk, service or as paged through the document.

Secure Saving, Loading, and API Sending Plus Receiving

Securely send encrypted documents through the EscrowTab mobile application system and method. The EscrowTab mobile application uses services AES 256 for encryption and SHA 256/512 hashes for verification.

Server/Cloud

Web services API backend is used to facilitate all securely sent and received documents. Web services are a secure rest API built using standard web services to communicate with the backend at any cloud provider.

Web Management Application

The web management application allows management of companies, users of all types and documents. Users include administrators, financial institutions and their agents.

Secure Document Storage Plus Data

Securely store the documents that are to be signed and store documents after signing is complete. Securely store all data associated with company, agent, notary and document information that run the EscrowTab mobile application and services.

Technology

Technologies used for building EscrowTab include tools ranging from data to interactive user interfaces.

EscrowTab Mobile Application

The EscrowTab mobile application system and method is built with Xamarin. Xamarin is used to be similar to the backend and built with .NET/C#. Similar libraries are used on the mobile application and server to help improve integration and consistency.

Xamarin allows the EscrowTab mobile application to be developed once for most of any mobile platforms, with specifics on each platform for only the features/libraries needed to get the most out of performance, such as the drawing overlay in native drawing libraries, while most of the application is in shared views for any platform.

Server/Cloud

Azure Cloud plus App Services is the current cloud provider that stores all EscrowTab mobile application data securely and facilitates service routes for different states/views of the mobile application.

Encrypted documents in unsigned and signed states are stored only on the server in encrypted storage. Documents are destroyed on the mobile client app when the signing process is complete for that document workflow.

Azure SQL Databases

Normalized data that contains all company, agent, notary, and document information is contained within Azure SQL Databases.

Commercial Real Estate EscrowTab Mobile Application Transactions

The EscrowTab mobile application system and method is adaptable to commercial real estate transactions. Unless the commercial property consists of raw land, there will be an assignment and assumption of leases. These documents processed through the EscrowTab mobile application accomplish three goals. First, it clarifies that the obligations of the seller under the leases have been passed to the buyer. The seller does not want to be subject to the contractual obligations under the leases for things such as tenant build-outs, etc. Second, the document clarifies that the benefits of the seller under the leases have passed to the buyer of the property. Third, these documents are useful tools for notifying tenants that the property has been conveyed. Many national tenants require formal documentation between the seller and buyer of the property. These documents are transmitted through the EscrowTab mobile application for review and execution. There usually will be a sale and assignment of contracts. Typically, the buyer of a commercial property will want to retain at least some of the service contracts for the property, such as elevator maintenance, landscaping, etc. All of these types of documents are transacted through the EscrowTab mobile application.

Closing Commercial Real Estate Transactions Through the EscrowTab Mobile Application System and Method.

The present invention, EscrowTab mobile application system and method provides a mobile application system and method to create entities such as corporations, limited liability corporations, partnerships, limited partnerships and other entities to transact commercial real estate transactions through documents transacted via the EscrowTab mobile application.

(1) Use of Entities.
  The biggest difference between closing a residential real estate transaction and commercial real estate transaction is the use of entities, rather than individuals, in the ownership of the real estate. Commercial real estate is rarely owned by individuals because of the desire to limit liability and the demands of capital sources. Closing a commercial real estate transaction involves attention to the organization of new entities and the authorization of the transaction through the management structure of the entities. These documents are transmitted, reviewed, and executed through the EscrowTab system and method by principals of the contractual entities.

Commercial property is underwritten by investors and lenders on the cash flow and appraised value of the property, with much less emphasis on the credit of the principals. Having the property owned in an entity will shield the property from the credit risk of individual principals. Principals of these entities review and execute associated documents through the EscrowTab mobile application.

(2) Escrow.

A commercial real estate closing will generally involve a more formal escrow process than in a residential transaction. Typically, the title agent will agree to hold the money, collect and record all documents, and wire out the money. The more formal escrow is due largely to the larger sums of money involved and the numerous documents that may come in from other capital sources. These numerous documents are reviewed and executed through the EscrowTab mobile application.

(3) Title and Survey.

Title to a commercial property is generally more complex than title to a residential property. In most commercial property there is an amalgam of numerous lots, subject to easements for utilities, old rights of way, etc. These numerous documents are reviewed and executed through the EscrowTab mobile application.

For commercial properties, an ALTA survey is required to delete the survey exception on a title policy. Mortgage plot plans are not sufficient. These ALTA documents are reviewed and executed through the EscrowTab mobile application.

(4) Pre-Closing Diligence.

Most commercial transactions provide for a fixed diligence date. Much work needs to be done and agreed upon prior to the closing. Zoning, title, survey and tenant leases must be acceptable to the purchaser, and the purchaser must raise any objections prior to the expiration of the diligence period. These numerous documents are reviewed and executed through the EscrowTab mobile application.

(5) Closing Documents.

As with residential transactions, commercial real estate transactions will include a typical quitclaim deed, non-foreign affidavit and title affidavit. However, there will be several other documents included in the transfer package. These numerous documents are reviewed and executed through the EscrowTab mobile application.

The EscrowTab mobile application system and method further automates review and execution of documents used in Financial Institution transactions related to Personal Property. All transaction documents in these financial areas are transmitted electronically from a financial institution to a borrower through an EscrowTab mobile application system and method of the present invention. These transaction documents, when executed, are transmitted back to the financial institution. Transmission medium is via the internet or a dedicated communications medium.

There is typically a bill of sale conveying any personal property included in the real estate transaction. This personal property would not otherwise transfer to the buyer with the transfer of fee title. This document also transfers items such as warranties and supplier guarantees. Most roof warranties require an explicit assignment for the warranty to remain in effect. These instruments are reviewed and executed through the EscrowTab mobile application.

(a) Title Issues.

The title review process is used to determine the condition of the title to be transferred to the buyer at closing as well as identifying potential title problems. Title documents are processed through the EscrowTab mobile application.

Title Insurance Commitment. The initial step in the title review process is the issuance of a title insurance commitment or preliminary title report. This initial document provides documentation of the current state of title for the property and includes the precise legal description of the property. These documents are processed through the present invention, EscrowTab mobile application system and method.

What is claimed is:

1. A method for review and execution of electronic documents comprising:
   i. receiving, on a mobile device, one or more electronic documents in PDF format:
   ii. overlaying, through a mobile application running on the mobile device, on the one or more electronic documents at least one editable layer;
   iii. presenting, through the mobile application running on the mobile device, a visual display of the one or more electronic documents with at least one editable layer;
   iv. receiving, by the mobile application running on the mobile device, into the at least one editable layer of the one or more electronic documents a first signature made by a party on the mobile device by detecting handwriting, by the party, upon the mobile device;
   v. receiving, by the mobile application running on the mobile device, into the at least one editable layer of the one or more electronic documents an electronic notary seal of a notary;
   vi. receiving, by the mobile application running on the mobile device, into the at least one editable layer of the one or more electronic documents a second signature made by the notary on the mobile device by detecting handwriting, by the notary, upon the mobile device;
   vii. flattening, by the mobile application running on the mobile device, the at least one editable layer by excluding portions of the at least one editable layer without either the first or second signature, thereby creating an executed document; and
   viii. transmitting, from the mobile device, the executed document.

2. The method of claim 1, wherein receiving the first signature comprises detecting, by the mobile application, a digital pen touching the mobile device, thereby emulating a paper-based experience of signing documents.

3. The method of claim 1, wherein the first signature is received into a first editable layer of the one or more electronic documents and wherein the second signature is received into a second editable layer of the one or more electronic documents.

4. The method of claim 1, wherein the first signature and the second signature are received into a first editable layer of the one or more electronic documents.

5. A method for review and execution of electronic documents comprising:
   i. receiving, on a mobile device, one or more electronic documents;

ii. presenting, through a mobile application running on the mobile device, a visual display of the one or more electronic documents with at least one editable layer overlain thereon;

iii. obtaining, by the mobile application running on the mobile device, in the at least one editable layer of the one or more electronic documents a first signature made on the mobile device;

iv. obtaining, by the mobile application running on the mobile device, in the at least one editable layer of the one or more electronic documents a second signature made on the mobile device;

v. flattening, by the mobile application running on the mobile device, the at least one editable layer by excluding portions of the at least one editable layer without either the first or second signature, thereby creating an executed document; and vi. transmitting, from the mobile device, the executed document.

6. The method of claim 5, wherein the presenting the visual display of the one or more electronic documents includes scrolling through the one or more electronic documents on the mobile device.

7. The method of claim 5, wherein obtaining the first signature comprises detecting, by the mobile application, handwriting, by a party to the one or more electronic documents, upon the mobile device.

8. The method of claim 5, wherein obtaining the first signature comprises detecting, by the mobile application, a digital pen touching the mobile device.

9. The method of claim 5, wherein the first signature is received into a first editable layer of the one or more electronic documents and wherein the second signature is received into a second editable layer of the one or more electronic documents.

10. The method of claim 5, wherein the first signature and the second signature are received into a first editable layer of the one or more electronic documents.

11. The method of claim 5, wherein the at least one editable layer comprises a full screen layer of the one or more electronic documents, emulating a paper-based experience of signing documents.

12. A method for review and execution of electronic contractual documents comprising:

i. receiving, on a mobile device, one or more electronic documents;

ii. presenting, through a mobile application running on the mobile device, a visual display of the one or more electronic documents with at least one editable layer overlain thereon;

iii. obtaining, by the mobile application running on the mobile device, in the at least one editable layer of the one or more electronic documents a first signature made on the mobile device;

iv. flattening, by the mobile application running on the mobile device, the at least one editable layer by excluding portions of the at least one editable layer without the first signature; and v. transmitting, from the mobile device, the one or more electronic documents, including the at least one editable layer containing the first signature.

13. The method of claim 12, further including overlaying, through the mobile application running on the mobile device, at least one full-screen editable layer on the one or more electronic documents.

14. The method of claim 12, wherein the presenting the visual display of the one or more electronic documents includes scrolling through the one or more electronic documents on the mobile device.

15. The method of claim 12, wherein obtaining the first signature comprises detecting, by the mobile application, handwriting, by the contracting party, upon the mobile device.

16. The method of claim 12, wherein obtaining the first signature comprises detecting, by the mobile application, a digital pen touching the mobile device.

17. The method of claim 12 further comprising:

obtaining, by the mobile application running on the mobile device, into the at least one editable layer of the one or more electronic documents an electronic notary seal of a notary; and receiving, by the mobile application running on the mobile device, into the at least one editable layer of the one or more electronic documents a second signature made by the notary on the mobile device.

18. The method of claim 17, wherein the first signature is received into a first editable layer of the one or more electronic documents and wherein the second signature is received into a second editable layer of the one or more electronic documents.

19. The method of claim 17, wherein the first and second signatures are received into a single editable layer of the one or more electronic documents.

20. The method of claim 12, wherein the at least one editable layer fully covers the one or more electronic documents when overlain thereon, emulating a paper-based experience of signing documents.

* * * * *